United States Patent [19]

Nachtigal

[11] 4,164,038
[45] Aug. 7, 1979

[54] COMBINATION CALCULATOR AND TIME BILLING DEVICE

[76] Inventor: Paul Nachtigal, 481 Grove St., Ridgewood, N.J. 07450

[21] Appl. No.: 812,828

[22] Filed: Jul. 5, 1977

[51] Int. Cl.² ............... G04B 47/00; G04F 10/00; G06F 15/20
[52] U.S. Cl. .................. 364/705; 58/39.5; 235/92 T; 364/406
[58] Field of Search ............ 364/406, 467, 569, 705; 235/92 AC, 92 T, 92 SB; 324/181, 186; 346/20; 58/24 A, 39.5

[56] References Cited

U.S. PATENT DOCUMENTS

| | | | |
|---|---|---|---|
| 3,648,243 | 3/1972 | Wiggins | 364/406 X |
| 3,665,165 | 5/1972 | Strandberg et al. | 235/92 T |
| 3,816,730 | 6/1974 | Yamamoto et al. | 364/705 |
| 3,922,531 | 11/1975 | Willmann et al. | 235/92 T |
| 3,955,355 | 5/1976 | Luce | 364/705 X |
| 4,022,014 | 5/1977 | Lowdenslager | 364/569 X |
| 4,025,774 | 5/1977 | Johnson et al. | 364/569 |
| 4,035,627 | 7/1977 | Dickinson et al. | 364/709 X |

*Primary Examiner*—Jerry Smith
*Attorney, Agent, or Firm*—David S. Woronoff

[57] ABSTRACT

A portable calculator is adapted to provide a time billing function and a calculating function. A "stop watch" function is actuated to start the billing period and stop the billing period attributable to a particular account. A memory stores the accumulated billing time for the particular account until properly cleared.

8 Claims, 1 Drawing Figure

COMBINATION CALCULATOR AND TIME BILLING DEVICE

FIELD OF THE INVENTION

This invention relates to portable calculator systems and more particularly to such a system for keeping a record by account number of the time worked on the calculator chargable to a particular account.

BACKGROUND OF THE INVENTION

Portable calculators are well known. Watch and calculator combinations are well known also as shown by U.S. Pat. Nos. 3,928,960 and 3,816,730 issued to Reese and Yamamoto et al respectively each show an electronic calculator with a digital clock showing a common display and operative to function either as a calculator or a clock depending on the state of a switch. A digital alarm clock, stop watch device is known which can store up to 4 alarm times.

U.S. Pat. No. 4,013,901 issued to Williams shows a timekeeping system using integrated injection logic ($I^2L$) which has very high density circuity.

U.S. Pat. No. 3,955,355 issued to Luce shows an electronic watch and calculator designed to be worn on the wrist of the user.

As the patents to Luce, Yamamoto, and Reese show there has been no attempt to functionally integrate the clock function with the calculator function utilizing a memory function to produce a record of elapsed time of use of the calculator which might be charged to specific accounts or projects.

Such a function would be very useful to accountants, lawyers, engineers and many others who bill or charge time to others. By using a printout record such a device could be used to replace the traditional time clock mechanism or the manual time record log used in many small companies or firms.

No known device performs the functions of time keeping, calculating, memory and integrate the three to form an electronic stop watch-calculator which keeps a record of the time by account number.

SUMMARY OF THE INVENTION

The present invention relates to a functionally integrated combination of an electronic calculator, electronic digital watch with "stop-watch" function, memory capacity and electronic and paper display in a portable unit.

Electronic calculators come with a wide variety of functions ranging from the simple add, subtract, multiply and divide to the more complex electronic "slide rule" type manufactured by Hewlett-Packard and Texas Instruments among others. Similarly digital electronic watches showing time, day, date, a.m./p.m. and multiple time alarm functions are commonly available. Such watches are manufactured by Texas Instruments, Sony, Hewlett-Packard and many others.

The present invention merges the technology of these devices, and may use a separate or a common memory structure, a time start and a time stop function. The memory structure can store the time lapse (the difference between time start and time stop) for several periods of use and the calculator may have some memory capacity for calculation. The time lapse may be stored either as a difference signal or stored directly in counters. The present invention shows both an electronic readout and a paper printout as possible output.

DESCRIPTION OF THE INVENTION

Figure 1:
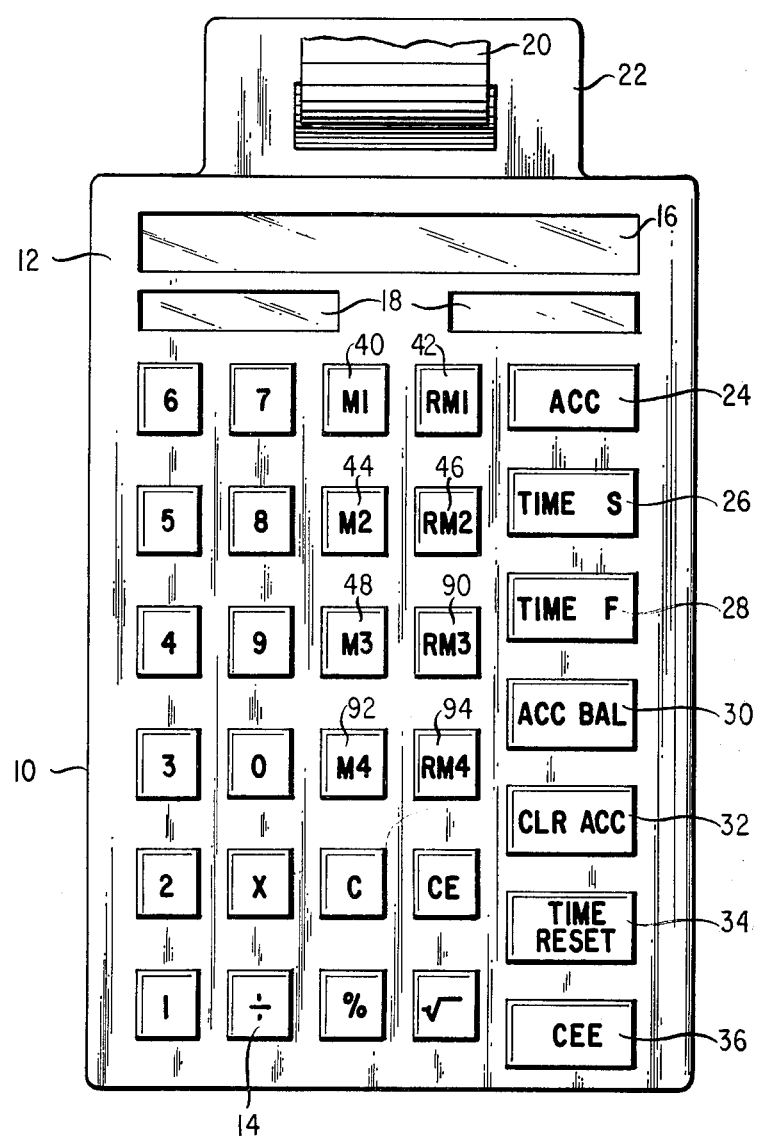
FIG. 1 shows a calculator-clock assembly with an electronic and a mechanical readout.

FIG. 1, shows by the numeral 10 a portable electronic calculator-clock-stop-watch device including a case 12 and a keyboard 14 in which specific keys are illustrated. Other particular keyboards could be used depending on the complexity or simplicity of calculator needed.

Two types of output are shown, although only one may be used. One is the separate electronic digital display 16 for the numbers and the electronic display for the time, day and date 18. The other is the printout tape 20 driven by the printer 22 for producing a "hard" record of the output.

A variety of special keys are shown each having unique function. Account Number key 24 is for directing the device to record the time for the particular account activated by using the calculator keyboard. Time start key 26 and time finish or stop key 28 cause the memory to record the elapsed time either as a difference signal or in a BCD Counter arrangement. When time finish key 28 is activated the elapsed time to be charged to the account previously indicated is stored in the appropriate memory register.

A clear-all account function is actuated by control button 32. An up-to-date account balance is activated by "Account Balance" key 30. A time reset button 34 is also provided. Button 36 has a clear clock entry function when activated.

Figure 2:
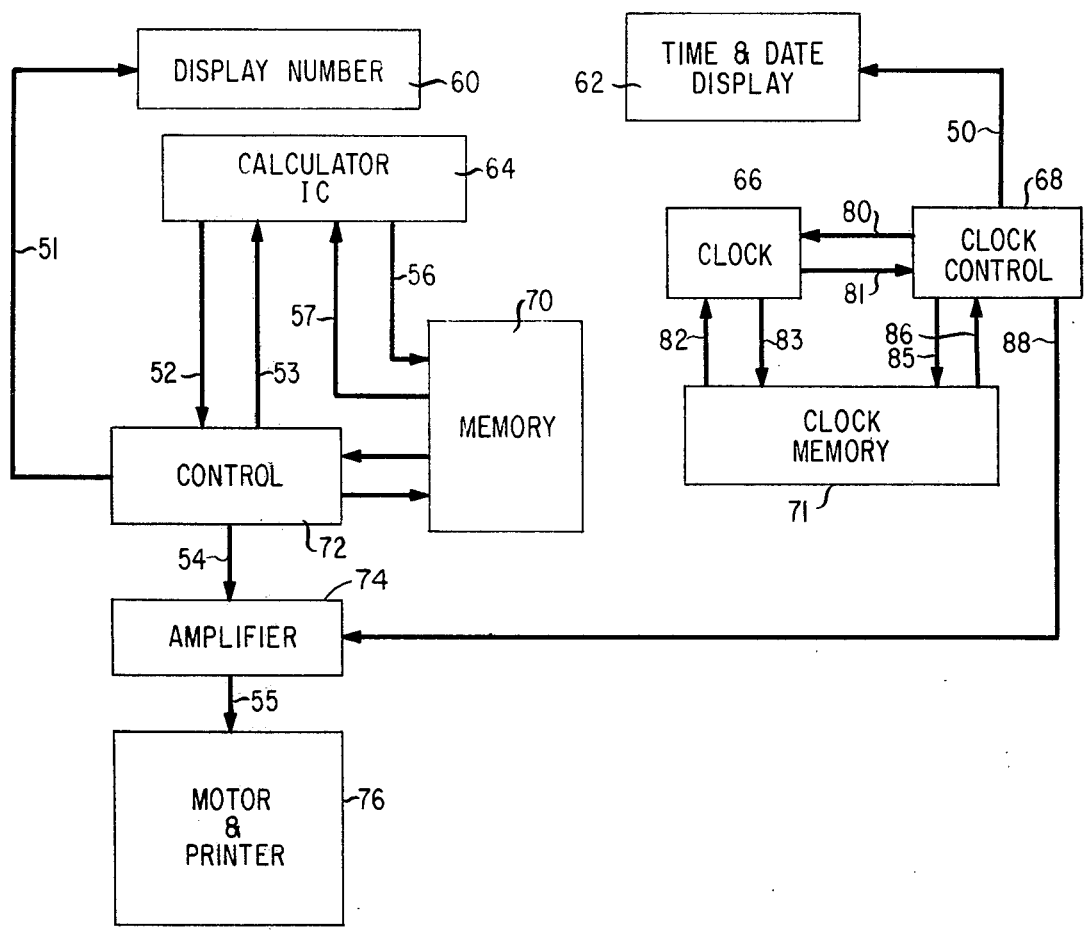
FIG. 2 shows a block diagram of the functional blocks of a device shown in FIG. 1.

FIG. 2 shows a block diagram for the portable calculator-clock-stop watch. Calculator integrated circuit (chip) 64 and clock integrated circuit (chip) 66 are respectively activated by calculator control 72 and clock control 68. Input and output leads 53, 52, and 80, 81 interconnect the respective calculator controls and time controls to the calculator chip and the clock chip. Clock memory 71 is interconnected to clock control 68 by leads 85, 86 and lead 88 connects the clock control to amplifier 74 for driving printer 76 through amplifier 74.

Memory 71 is operably interconnected by leads 82, 83, to the clock chip and Memory 70 by leads 56, 57 to the calculator chip. Either or both Memories 70, 71 may have several registers accessible by keys M1, RM1, M2, RM2, M3, RM3, M4, RM4, shown by numerals 40, 42, 44, 46, 48, 90, 92, 94. More than 4 memory registers may be used. The calculator control 72 also has an interconnection to the memory 70. The calculator control is connected by wire 51 to the electronic display 60 and to printer 76 through amplifier 74 and lead 54. Lead 50 connects the time display 62 to the clock output 66 by way of control 68. Memory 71 may be formed from a plurality of well known BCD counters which are controlled by keys 26 and 28 and which transfer the output to a previously selected memory register.

Figure 3:
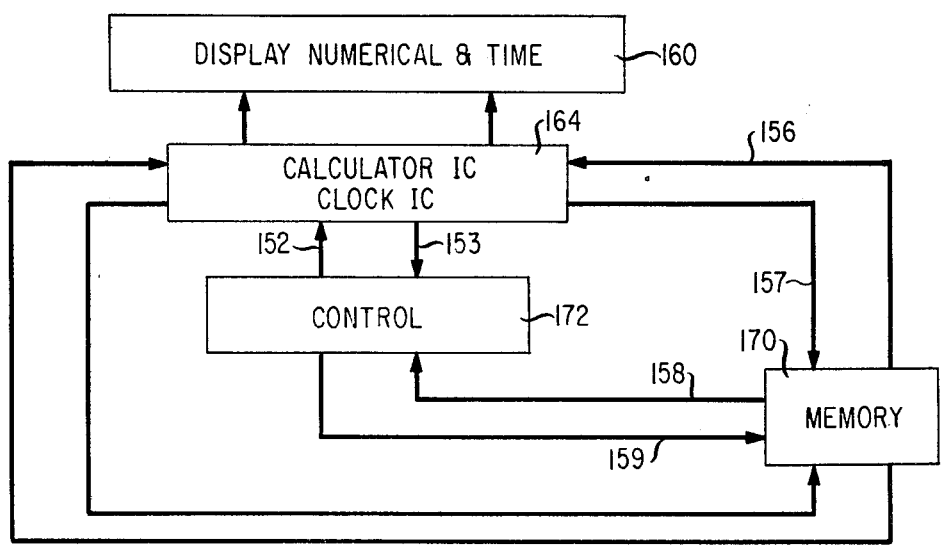
FIG. 3 shows another embodiment of the present invention using a common electronic display and a common I.C. chip.

The circuit shown in FIG. 3 shows an embodiment of the present invention using a single integrated circuit (chip) 164 having both the calculator and clock function therein. A common control 172 has interconnection to the common chip 164 by means of leads 152, 153. A common memory 170 has input and output leads 157, 156 to the integrated circuit and input and output leads 158, 159 to the control 172.

In operation when a user wants to do work for charging to a particular account he activates button 24 and enters the account number through keys 14. The operator then activates "Time Start" button and commences work in the usual manner. When he is finished his work for that particular account he presses the "Time Finish" button. The operator then activates the account balance button and the plus button on the calculator keyboard causing the elasped time to be recorded in the memory. If BCD counters in the clock memory are activated by "Time Start" and "Time Finish" buttons, the output may be passed directly to the correct memory register keyed by the "account" button and no "account balance" key would need to be actuated.

What is claimed is:

1. In a portable electronic device having time keeping and calculating functions the combination comprising: first integrated circuit means having calculating and time keeping function; first control means for accessing said first integrated circuit means; first output means interconnected to said first integrated circuit means for displaying the output of said first integrated circuit means; first memory means having capacity to store information by specific address and cumulate said information; said control means including means for generating a time start and time stop signals; said first integrated circuit means including means for accumulating the time elapsed between the said time start and time stop signals; interconnecting means for conveying the accumulated elapsed time to said first memory means for storing said calculated elapsed time and keyboard means having a plurality of field keys and numerical keys; said field keys including a "time start" key, a "time stop" key and an "account key"; and, said memory means comprises a plurality of addressable memories; said addressable memories adapted upon the actuation of one of said "account key" to add elapsed time to stored time.

2. The device claimed in claim 1 including further:
   a printer means connected to said first output means for producing a printed record.

3. The device claimed in claim 1 including further: an account balance key for causing said display to show the amount of time stored in a particular addressable memory without erasing said memory.

4. The device claimed in claim 3 wherein actuation of said "account balance" key enables the display of recalled stored time when the device is performing said time keeping and calculating functions.

5. The device claimed in claim 1 including further: a "clear account" key for returning to zero all addressable memories.

6. The device claimed in claim 5 including further: an "account balance" key for causing said display to show the amount of time stored in a particular addressable memory.

7. The device claimed in claim 1 wherein actuation of said "account key" and said "time start" key enables said integrated circuit means to calculate elapsed time and simultaneously be used for numercial calculations.

8. The device claimed in claim 7 including further a printing means which shows the account numbers, date and elapsed time to provide a printed record to supplement the accumulated time record stored in the addressable memory by account number.

* * * * *